Patented Oct. 12, 1926.

1,602,594

UNITED STATES PATENT OFFICE.

SAMUEL E. SHEPPARD, OF ROCHESTER, NEW YORK, ASSIGNOR TO EASTMAN KODAK COMPANY, OF ROCHESTER, NEW YORK, A CORPORATION OF NEW YORK.

FLUORESCENT MATERIAL AND METHOD OF PREPARING SAME.

No Drawing. Continuation of application Serial No. 28,004, filed May 4, 1925. This application filed February 17, 1926. Serial No. 88,954.

This invention relates to improvements in the material used as the active fluorescent agent in X-ray intensifying screens. A well known and undesirable characteristic of the salt principally used, calcium tungstate, is its tendency to give phosphorescence on exposure to X-rays as well as fluorescence. That is, it will continue to emit light after the exciting rays have ceased. The degree of this fault varies with different batches of material. Various methods of preparing very pure tungstate to overcome this trouble have been described, but they are tedious, costly and uncertain. I have found that this phosphorescence, which is generally called "after-glow" or "lag", may be markedly reduced by incorporating a small amount of certain molybdenum compounds in the calcium tungstate. The quantities necessary to reduce phosphorescence to an innocuous point are very small and do not appreciably affect or reduce the fluorescence.

The molybdenum compound may be introduced during the manufacture of the tungstate by any of the usual or known methods or may be added in aqueous solution to the tungstate after manufacture by any customary process.

One of the known methods of making calcium tungstate is by the fusion of calcium chloride and sodium tungstate at a temperature of the order of between 1800° and 2000° F. In this process I add the molybdate, usually the sodium or ammonium salt of molybdic acid, before fusion and carry on the process in the usual way, quenching the fused mixture in water and washing it well.

A suitable quantity of the molybdate is from .2 to .5 per cent based on the dry weight of the calcium tungstate produced. Smaller quantities than this may be used, producing effective repression of phosphorescence (equal to present standards) but not such complete elimination, while the addition of more serves no useful purpose. The optimum quantity will vary with different batches of material and must be controlled by test.

The addition of the molybdenum compound is, however, equally effective when other methods of preparing the calcium tungstate are employed.

As stated above, the molybdenum compound may be added to the tungstate after its production by the method referred to above or by any other method. The proportion of the molybdate to the tungstate is the same as was mentioned above. An aqueous solution of the molybdate is added to the prepared tungstate, with which it is well mixed and the mixture then dried.

While for commercial and practical reasons, I use the salts mentioned, the molybdates of any of the alkali metals, (including ammonium) or of the alkaline earth metals are substantially equally effective. I may also use molybdic acid or any compound of molybdenum that will yield molybdic acid on oxidation, such as the sulphate or halides.

The same molybdenum compounds may be used in the similar treatment of and in the similar process of preparation of cadmium tungstate, or a mixture of calcium and cadmium tungstate, such as is used more especially for fluoroscopic screens for visual examination as distinguished from the intensifying screens of calcium tungstate used with photographic plates.

This application is a continuation of my application, Serial No. 28,004, filed May 4, 1925.

Having thus described my invention, what I claim as new and desire to secure by Letters Patent is:

1. A composition of matter in which has been incorporated a tungstate having high fluorescent properties when excited by X-rays and a compound of molybdenum which is capable, under oxidizing conditions, of insuring the presence of molybdic acid.

2. A composition of matter in which has been incorporated a tungstate having high fluorescent properties when excited by X-rays and a molybdate of an alkali metal or of an alkaline earth metal.

3. A composition of matter in which has been incorporated a tungstate having high fluorescent properties when excited by X-rays and a molybdate of an alkali metal.

4. A composition of matter in which has been incorporated two hundred parts of a tungstate having high fluorescent properties when excited by X-rays and less than one part of a molybdate of an alkali metal.

5. A composition of matter for use in X-ray screens in which has been incorporated calcium tungstate and a molybdate of an alkali metal.

6. The method of reducing the phosphorescent properties of a highly fluorescent tungstate that comprises the incorporation therewith of a molybdenum compound capable of insuring the presence of molybdic acid under oxidizing conditions.

7. The method of reducing the phosphorescent properties of a highly fluorescent tungstate that comprises the incorporation therewith of a molybdate of an alkali metal or of an alkaline earth metal.

8. The method of reducing the phosphorescent properties of a highly fluorescent tungstate that comprises the incorporation therewith of a molybdate of an alkali metal.

9. The method of reducing the phosphorescent properties of calcium tungstate that comprises incorporating therewith the molybdate of an alkali metal.

Signed at Rochester, New York this 12th day of February, 1926.

SAMUEL E. SHEPPARD.